United States Patent [19]
Lin

[11] Patent Number: 5,458,308
[45] Date of Patent: Oct. 17, 1995

[54] U-TYPE LOCK SUPPORTER

[76] Inventor: Wen-Yii Lin, No. 25-3, Hsin Tien, Hsin Tien Tusn, Jen Te Hsiang, Tainan Hsien, Taiwan

[21] Appl. No.: 173,170

[22] Filed: Dec. 27, 1993

[51] Int. Cl.$^6$ ................................................ E04G 3/00
[52] U.S. Cl. ............... 248/229.16; 248/314; 248/222.52; 224/39
[58] Field of Search ........................... 248/229, 230, 248/222.3, 316.7, 314, 541, 540; 224/39, 30 R, 41; 24/339; 70/233

[56] References Cited

U.S. PATENT DOCUMENTS

| | | | |
|---|---|---|---|
| 2,360,767 | 10/1944 | Elmquist | 224/39 R |
| 3,967,475 | 7/1976 | Zane | 224/39 |
| 4,436,232 | 3/1984 | Zane et al. | 224/39 |
| 4,736,921 | 4/1988 | Zane et al. | 248/229 |
| 5,076,526 | 12/1991 | Zane et al. | 248/541 |
| 5,127,562 | 7/1992 | Zane et al. | 224/39 |
| 5,133,568 | 7/1992 | Balterman | 248/229 |
| 5,167,353 | 12/1992 | Hughes | 248/229 |
| 5,386,961 | 2/1995 | Lu | 248/541 |

*Primary Examiner*—Karen J. Chotkowski

[57] ABSTRACT

A lock supporter made according to this invention has an oval channel with grooves disposed at the circumference of the upper and lower ends of the channel, respectively. A slot is provided at the front portion of the channel and a projected rib is provided at the lower position of the slot with a bracket disposed at the left side of the slot. The left side of the bracket is extended upward and a clipping member is provided at the top position. A pair of supporting blocks are provided at the lower position of the bracket. An oval rotating body is inserted into the channel through its length. The upper portion and lower ends of the oval rotating body are provided with ribs engaging the grooves. A U-type bracket is located in the rotating body. A groove disposed at the underside of the U-type bracket engages one of a plurality of ribs provided at the exterior surface of the rotating body, to hold the oval rotating body in a desired position.

1 Claim, 7 Drawing Sheets

U-TYPE LOCK SUPPORTER

BACKGROUND OF THE INVENTION

This invention relates to a supporter, more particularly, to a U-type lock supporter. This supporter facilitates an easy and firm engagement of a U-type lock by means of an oval channel of the supporting body, a tension of a rotating body and the clipping force of the rotating body when it is pressed.

The conventional U-type lock supporter, as shown in FIG. 1, comprises a supporting body 1 which is formed integrally. Channels 10, 11 are disposed respectively at both sides of the supporting body 1. A clipping member 12 is disposed at one side of the channel 10. A bracket 13 is disposed at one side of the channel 11. By this arrangement, a U-shape lock supporter is assembled.

But this conventional lock supporter is used as a supporter only and there is not any fastener for positioning the lock. In case the bicycle rides off-road, the lock may depart from the supporter.

SUMMARY OF THE INVENTION

It is the object of this invention to provide a U-type lock supporter which can support the U-type lock as well as fasten it to prevent the lock from departing.

In order to achieve the object set forth, the lock supporter made according to this invention comprises an oval channel. Grooves are disposed at the circumference of the upper and lower ends of the channel respectively. A slot is provided at the front portion of the channel. A projected rib is provided at the lower position of the slot and a bracket is disposed at the left side of the slot. The left side of the bracket is extended upward and a clipping member is provided at the top position. A pair of supporting blocks are provided at the lower position of the bracket. An oval rotating body is inserted into the channel through its length. The upper and lower ends of the oval rotating body are provided with ribs. A U-type bracket is disposed at the right side of the rotating body. A groove is disposed at the underside of the U-type bracket. A plurality of ribs are provided at the exterior surface of the rotating body.

BRIEF DESCRIPTION OF THE DRAWINGS

The structural and operational characteristics of the present invention and its advantages as compared to the known state of the prior art will be better understood from the following description, relating to the attached drawings which show illustratively but not restrictively an example of a U-type lock supporter. In the drawings.

DETAILED DESCRIPTION OF A PREFERABLE EMBODIMENT

Figure 1:
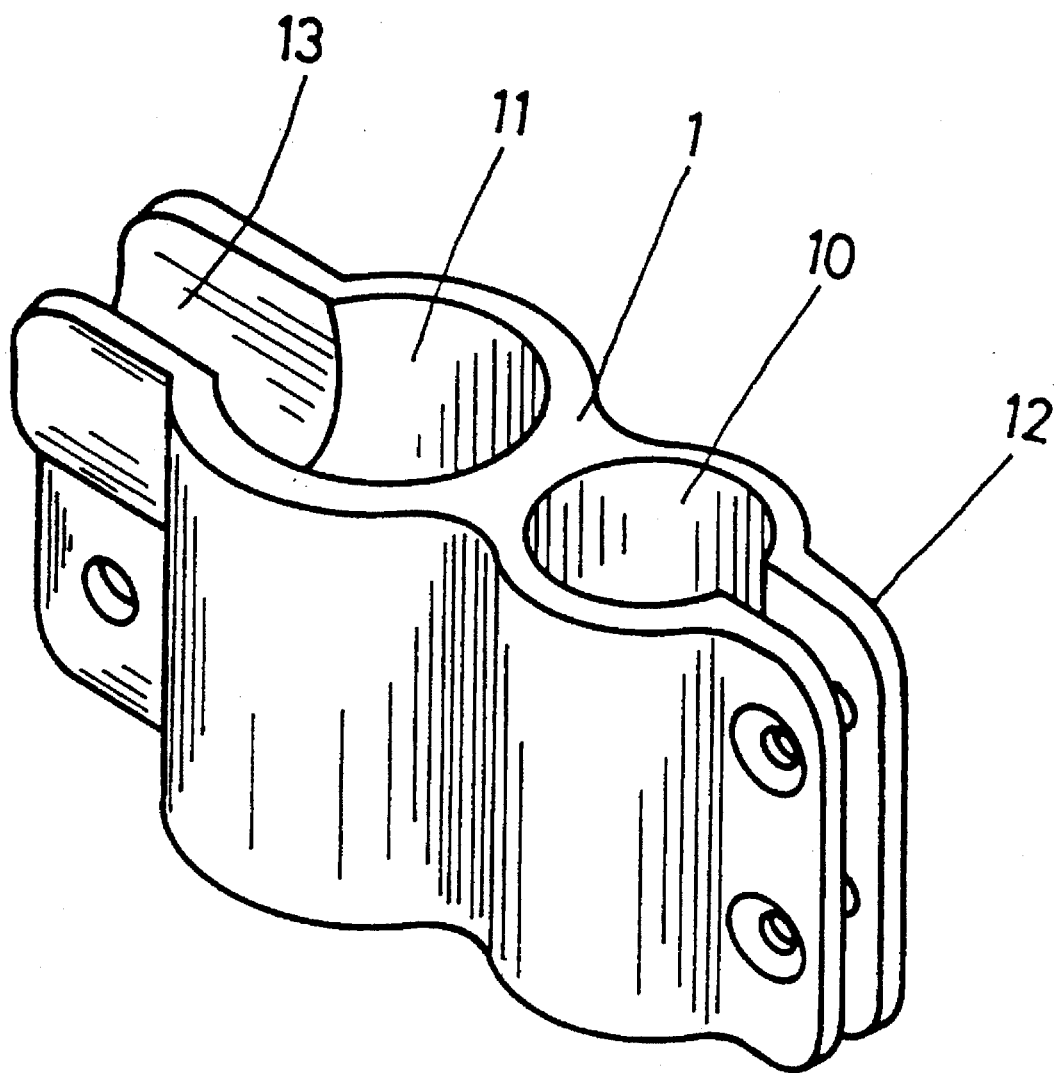
FIG. 1 is a perspective view of a conventional U-type lock supporter.
Figure 2:
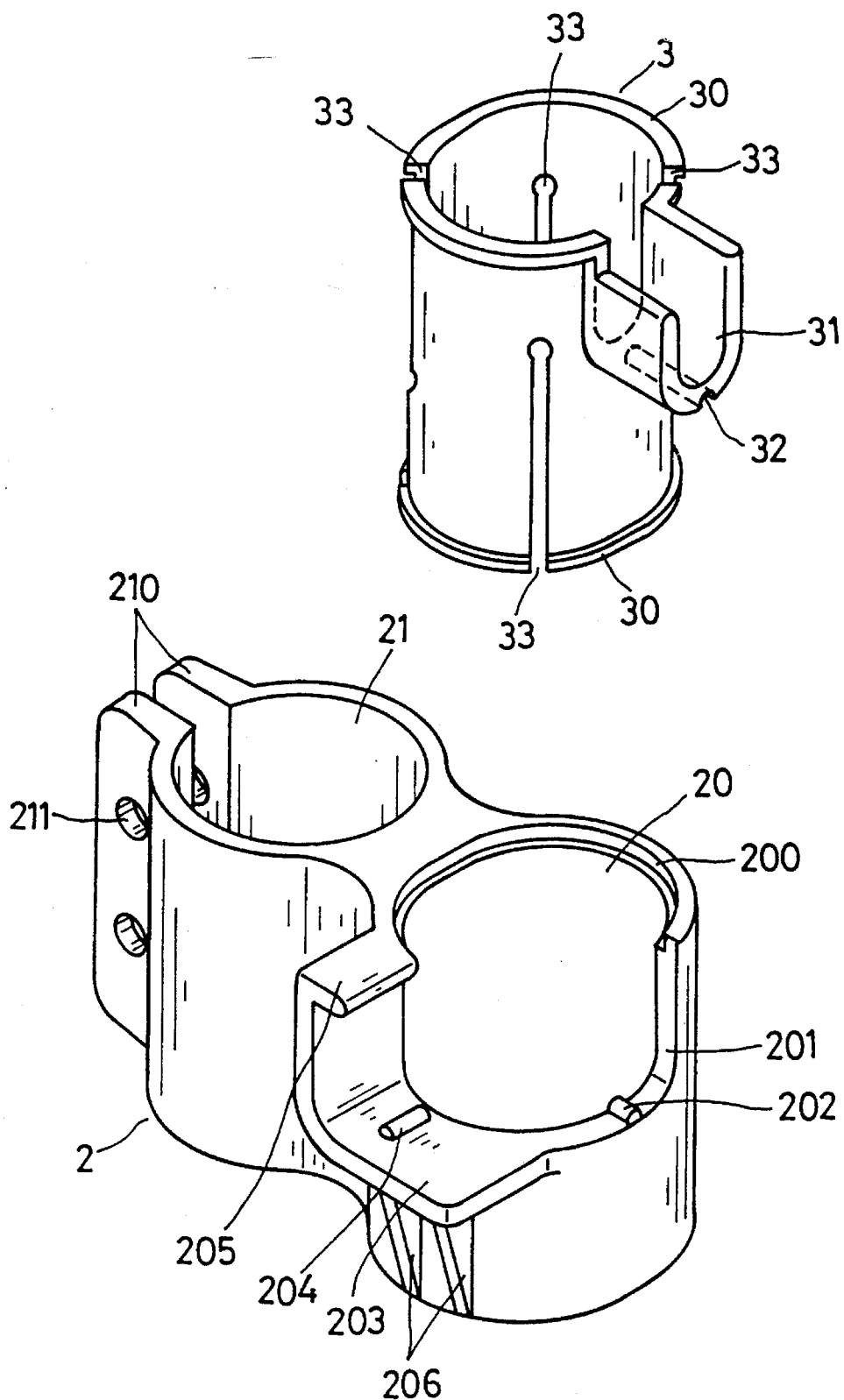
FIG. 2 is an exploded perspective view of a U-type lock supporter made according to the invention.

Referring to FIG. 2, the lock supporter made according to this invention comprises a supporter body 2. An oval channel 20 is disposed at the right side of the body 2. Grooves 200 are disposed at the circumference of the upper and lower ends of the channel 20 respectively. A slot 201 is provided at the front portion of the channel 20. A projected rib 202 is provided at the lower position of the slot 201. A bracket 203 is disposed at the left side of the slot 201. The left side of the bracket 203 is extended upward and a clipping member 205 is provided at the top position. A pair of supporting blocks 206 are provided at a lower position than the bracket 203. A circular channel 21 is disposed at the left side of the body 2. This circular channel 21 further includes a pair of clipping members 210 at a side portion. A through hole 211 is disposed at the side of the clipping member 210. An oval rotating body 3 is inserted into the channel 20 of the body 2 through its length. The upper and lower ends of the oval rotating body 3 are provided with ribs 30. A U-type bracket 31 is disposed at the right side of the rotating body 3. A groove 32 is disposed at the underside of the U-type bracket 31. A plurality of vertical slots 33 are provided at the exterior surface of the rotating body 3.

Figure 3:
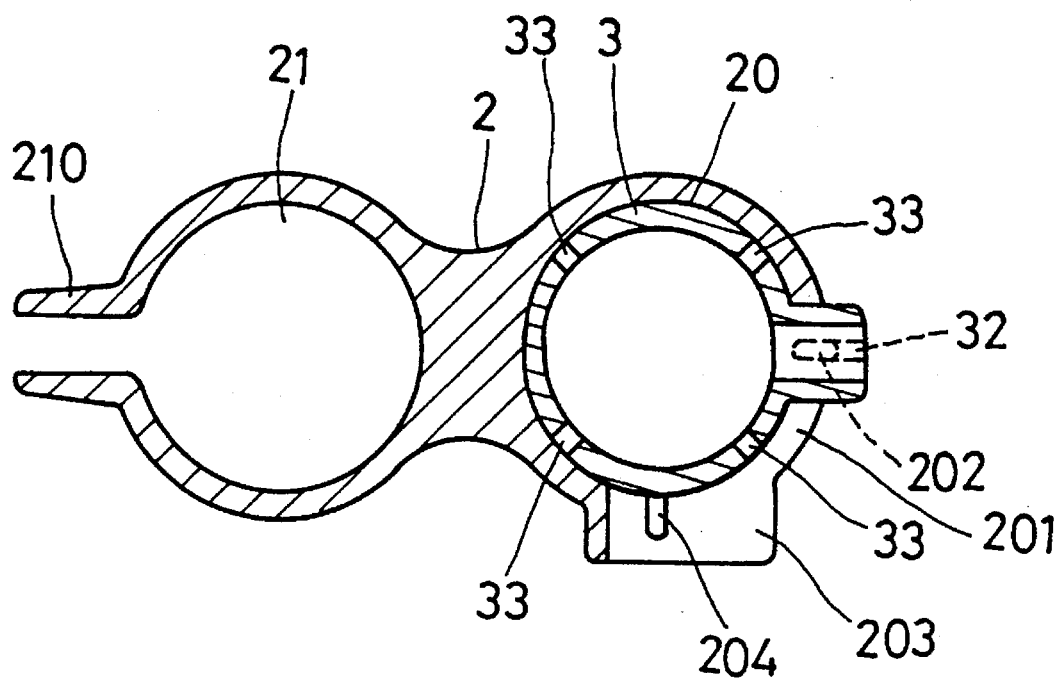
FIG. 3 is a cross sectional view of a U-type lock supporter showing the lock assembled.

In assembling, the rotating body 3 is inserted into the oval channel 20 of the body such that the ribs 30 are received by the grooves 200 of the channel 20. By this arrangement, the U-type bracket 31 which is located at the right side of the rotating body 3 is linked against the right side of the slot 201 of the channel 20 such that the groove 32 of the rotating body 3 is engaged with the projected rib 202 of the body 2, as shown in FIG. 3.

Figure 4:
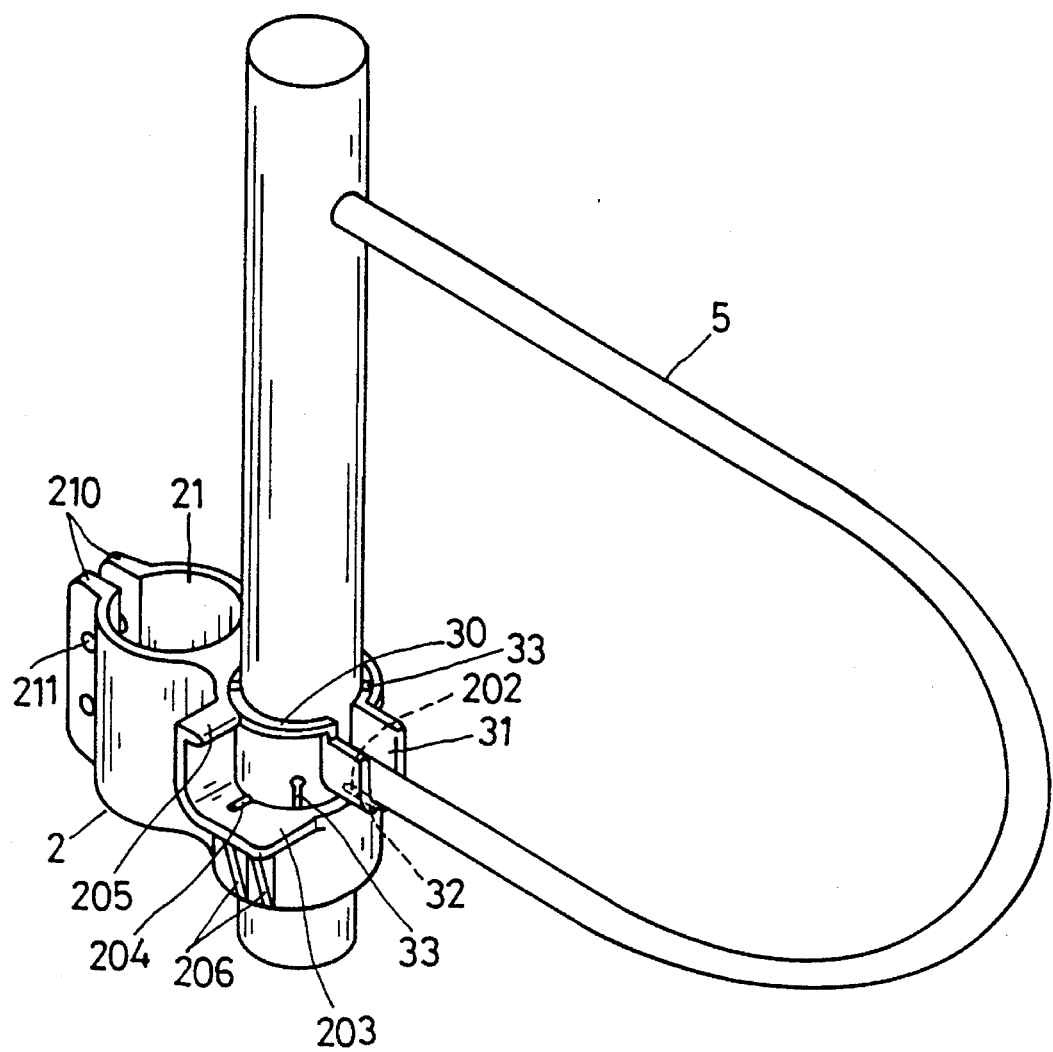
FIG. 4 is a perspective view of the supporter showing a U-type lock positioned therein.
Figure 5:
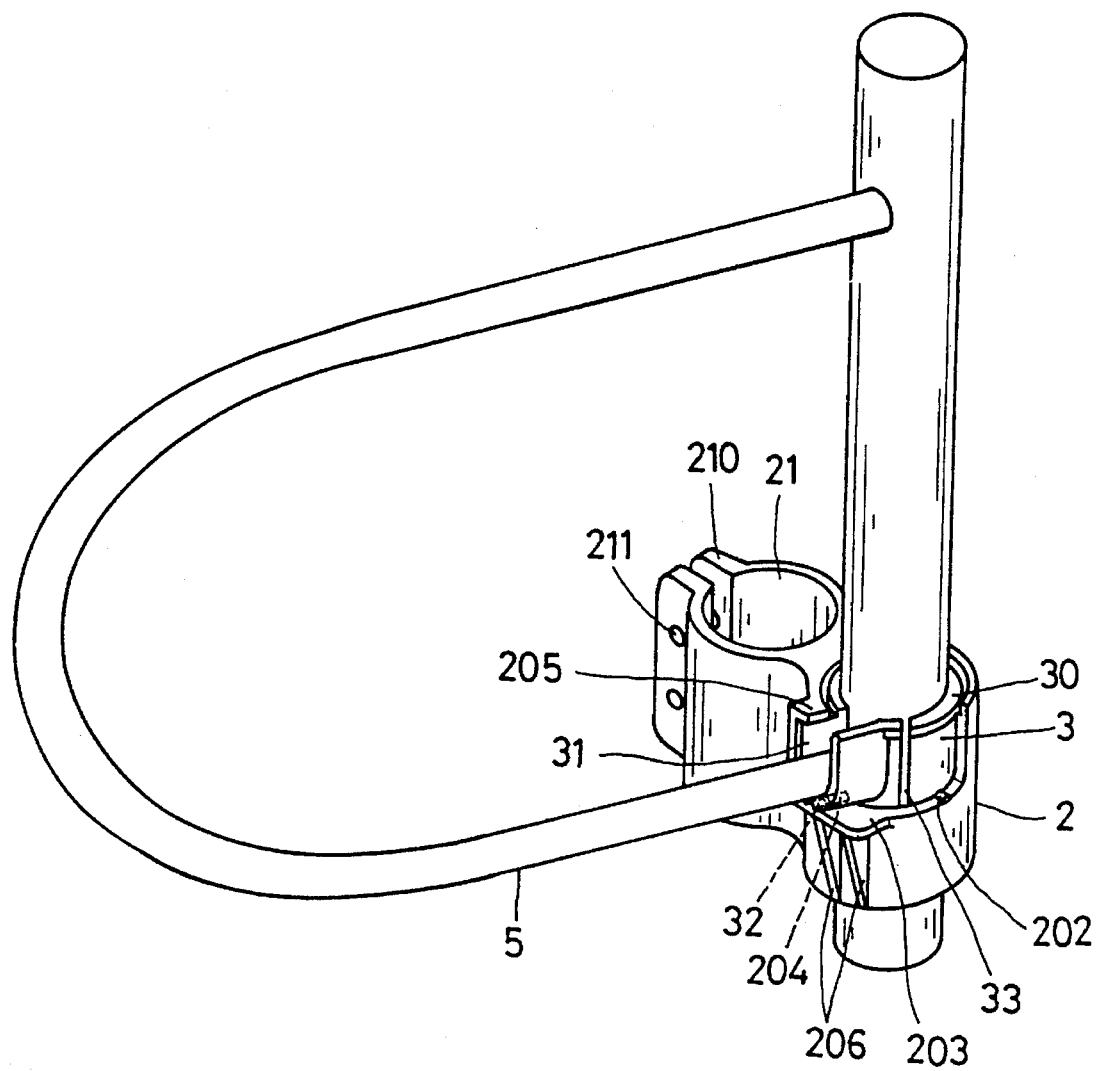
FIG. 5 is a perspective view of the supporter showing the rotating body after rotation.
Figure 6:
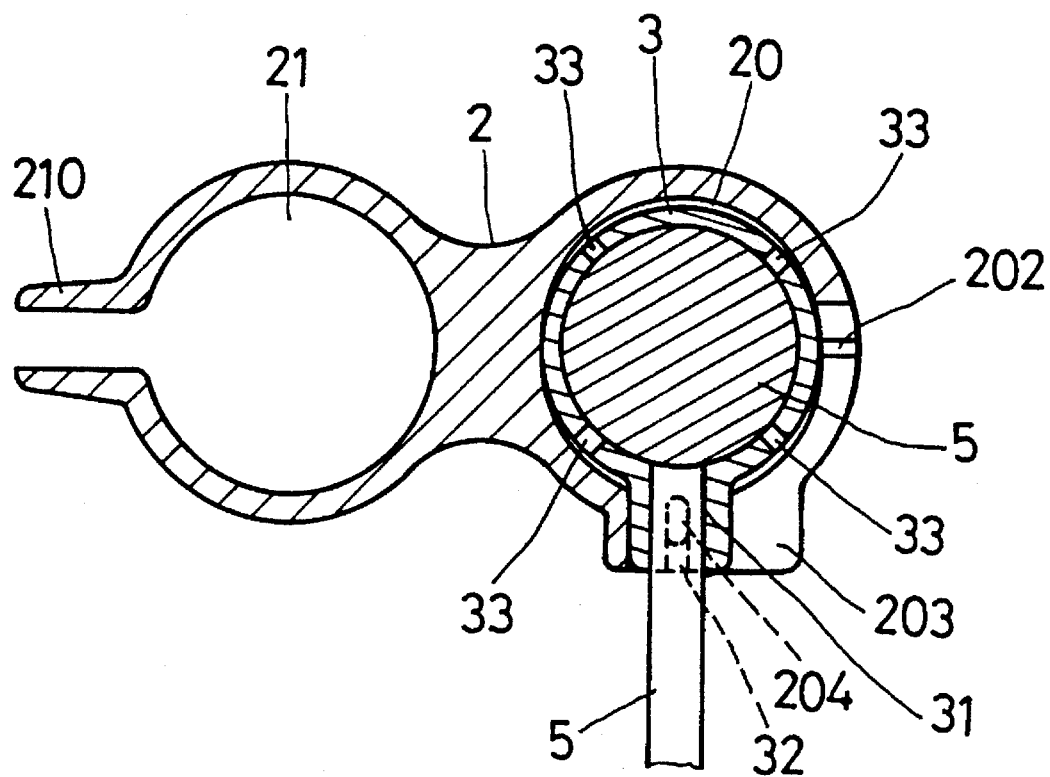
FIG. 6 is a cross sectional view of the supporter showing the rotating body after rotation.
Figure 7:
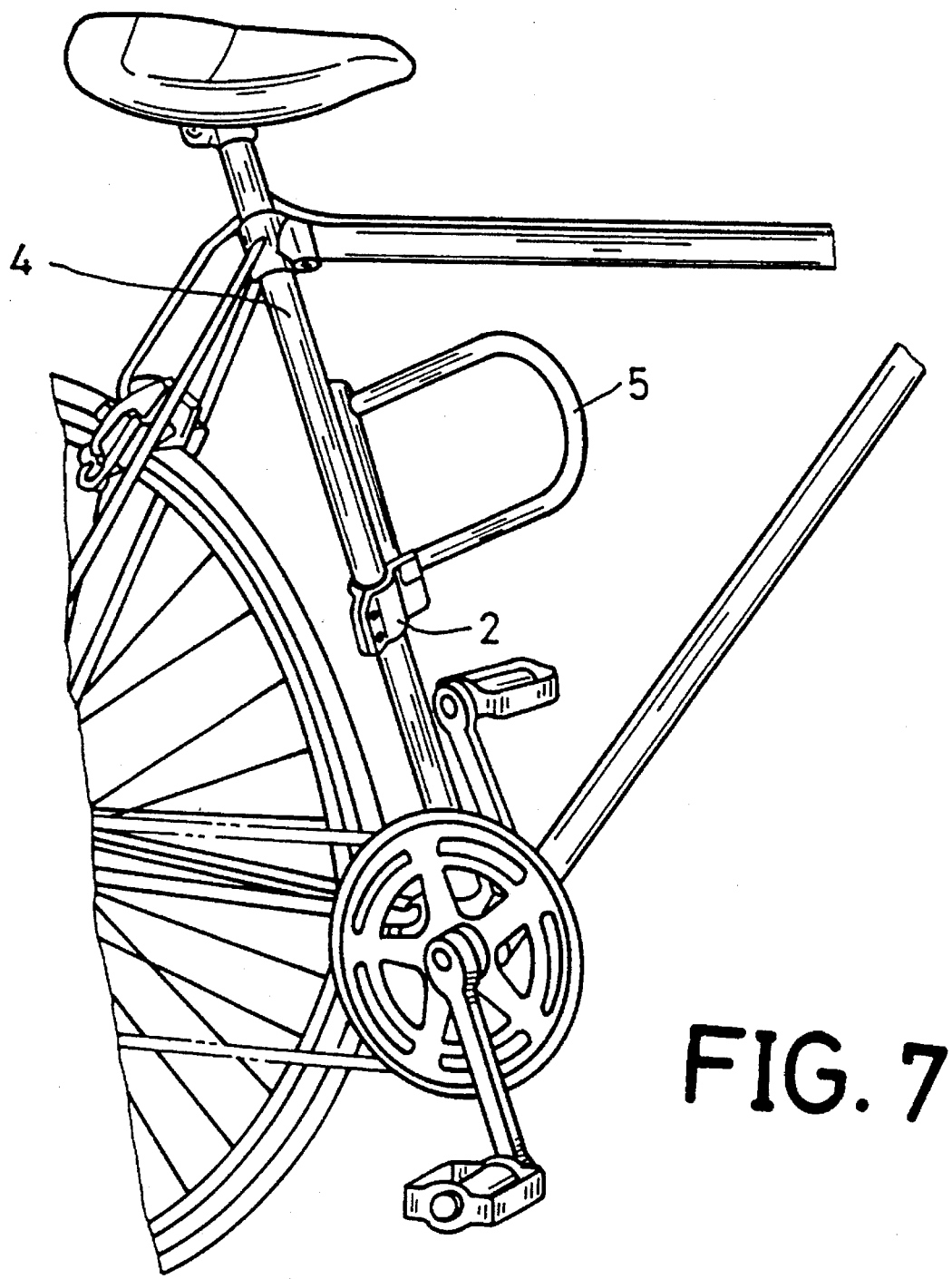
FIG. 7 is a partial perspective view of the supporter showing the supporter attached to a bicycle frame by means of screw members.

In application, screw members are inserted into the through hole 211 of the clipping member 210 to attach it to the frame 4, as shown in FIG. 7. Then the U-type lock 5 can be inserted into the bracket 31 and the rotating body 3, as shown in FIG. 4. When the U-type lock is positioned, and the U-type lock 5 is moved in the left direction, the groove 32 will release the projected rib 202 such that the rotating 3 rotates along the left direction. The vertical slots 33 of the rotating body 3 are pressed by the channel 20, as shown in FIGS. 5, 6. By this arrangement, the U-type lock 5 is firmly fixed within the rotating body 3. When the rotating body 3 rotates to the limit, the groove 32 of the rotating body 3 will engage the rib 204. By this arrangement, the U-type bracket 31 is pressed by the clipping member 205 as shown in FIGS. 5, 6.

The supporter of U-type lock can be concluded with the following advantages.

1. The supporter is easily assembled and readily operated.
2. The U-type lock is firmly fixed without departing therefrom.
3. The U-type lock is firmly supported thereof.

Although the present invention has been described in connection with preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. A U-type lock supporter comprising: a supporting body, a circular channel being disposed at a first side of the body, a pair of clipping members being provided at a side of the channel, each of said clipping members being provided with at least one through hole; an oval channel being provided in a second side of the body, grooves being disposed at a circumference of upper and lower ends of said oval channel respectively, a slot being provided at a front portion of the oval channel, a plurality of projected ribs being provided at a lower portion of the slot and a bracket being disposed at a side of the slot, a side of the bracket being extended upward and a clipping member being provided at a top portion thereof, a pair of supporting blocks provided at a lower position of the bracket; an oval rotating body being inserted into the channel through its length, upper and lower ends of the oval rotating body being provided with ribs, a U-type bracket being disposed at one side of the rotating body, and a groove being disposed at the underside of the U-type bracket; located therein the groove of the rotating body will be engaged with one of the plurality of projected ribs of the body such that a side of the U-type lock is clipped by the clipping member, to hold the U-type lock in the lock supporter.

* * * * *